US009763235B2

United States Patent
Vannithamby et al.

(10) Patent No.: US 9,763,235 B2
(45) Date of Patent: Sep. 12, 2017

(54) PAGING REPETITION FOR INCREASED ROBUSTNESS FOR EXTENDED PAGING CYCLES

(71) Applicant: Intel IP Corporation, Santa Clara, CA (US)

(72) Inventors: Rath Vannithamby, Portland, OR (US); Satish C. Jha, Hillsboro, OR (US); Ali Taha Koc, Portland, OR (US); Maruti Gupta, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/773,296

(22) PCT Filed: Mar. 21, 2014

(86) PCT No.: PCT/US2014/031509
§ 371 (c)(1),
(2) Date: Sep. 4, 2015

(87) PCT Pub. No.: WO2014/165338
PCT Pub. Date: Oct. 9, 2014

(65) Prior Publication Data
US 2016/0029344 A1   Jan. 28, 2016

Related U.S. Application Data

(60) Provisional application No. 61/808,597, filed on Apr. 4, 2013.

(51) Int. Cl.
*H04W 68/02* (2009.01)
*H04W 72/04* (2009.01)
(Continued)

(52) U.S. Cl.
CPC .......... *H04W 72/0413* (2013.01); *H04B 1/38* (2013.01); *H04B 7/024* (2013.01);
(Continued)

(58) Field of Classification Search
CPC ............... H04W 68/02; H04W 72/042; H04W 72/0446; H04W 4/005; H04W 76/046; H04W 76/048; H04W 88/02
(Continued)

(56) References Cited

U.S. PATENT DOCUMENTS

2009/0310503 A1 * 12/2009 Tenny ................... H04W 68/00
370/252
2011/0013554 A1   1/2011 Koskinen
(Continued)

FOREIGN PATENT DOCUMENTS

EP         2234447 A2    9/2010
EP         2369883 A1    9/2011
(Continued)

OTHER PUBLICATIONS

WO 2013/149666 A1 Rune et al. Apr. 5, 2012.*
(Continued)

*Primary Examiner* — Cong Tran
(74) *Attorney, Agent, or Firm* — Schwabe, Williamson & Wyatt, P.C.

(57) ABSTRACT

Embodiments described herein relate generally to a reliable delivery of a paging message in a wireless network environment. To prevent the unacceptable delay of delivery of a paging message to a UE, the number of paging opportunities that are to occur during a paging cycle may be increased. The UE may access a lookup table that indicates the paging opportunities for the paging cycle. The paging opportunities may correspond to subframes of the paging frame that include a paging message. The UE may then detect the (Continued)

paging message in a respective subframe of the paging frame that corresponds with a paging opportunity. Other embodiments may be described and claimed.

19 Claims, 9 Drawing Sheets

(51) Int. Cl.

| | | |
|---|---|---|
| H04L 5/00 | (2006.01) | |
| H04B 7/024 | (2017.01) | |
| H04W 24/02 | (2009.01) | |
| H04W 74/08 | (2009.01) | |
| H04W 36/30 | (2009.01) | |
| H04B 1/38 | (2015.01) | |
| H04W 76/00 | (2009.01) | |
| H04W 76/02 | (2009.01) | |
| H04W 24/08 | (2009.01) | |
| H04L 12/26 | (2006.01) | |
| H04W 4/00 | (2009.01) | |
| H04L 12/18 | (2006.01) | |
| H04L 29/08 | (2006.01) | |
| H04W 8/00 | (2009.01) | |
| H04W 56/00 | (2009.01) | |
| H04W 72/12 | (2009.01) | |
| H04L 5/14 | (2006.01) | |
| H04W 36/00 | (2009.01) | |
| H04L 1/18 | (2006.01) | |
| H04B 7/0456 | (2017.01) | |
| H04B 7/06 | (2006.01) | |
| H04W 76/04 | (2009.01) | |
| H04W 76/06 | (2009.01) | |
| H04W 84/12 | (2009.01) | |
| H04W 84/04 | (2009.01) | |
| H04W 88/02 | (2009.01) | |
| H04L 29/06 | (2006.01) | |
| H04W 92/20 | (2009.01) | |
| H04W 88/08 | (2009.01) | |
| H04W 36/38 | (2009.01) | |
| H04W 36/14 | (2009.01) | |
| H04W 36/36 | (2009.01) | |

(52) U.S. Cl.
CPC .......... *H04L 1/1854* (2013.01); *H04L 5/0053* (2013.01); *H04L 5/0055* (2013.01); *H04L 5/0094* (2013.01); *H04L 5/14* (2013.01); *H04L 12/18* (2013.01); *H04L 43/0823* (2013.01); *H04L 65/1016* (2013.01); *H04L 65/4076* (2013.01); *H04L 65/4092* (2013.01); *H04L 67/02* (2013.01); *H04L 67/1076* (2013.01); *H04W 4/005* (2013.01); *H04W 8/005* (2013.01); *H04W 24/02* (2013.01); *H04W 24/08* (2013.01); *H04W 36/0088* (2013.01); *H04W 36/0094* (2013.01); *H04W 36/30* (2013.01); *H04W 56/001* (2013.01); *H04W 68/02* (2013.01); *H04W 72/042* (2013.01); *H04W 72/048* (2013.01); *H04W 72/0446* (2013.01); *H04W 72/0486* (2013.01); *H04W 72/1215* (2013.01); *H04W 72/1263* (2013.01); *H04W 74/0808* (2013.01); *H04W 76/00* (2013.01); *H04W 76/02* (2013.01); *H04W 76/022* (2013.01); *H04W 76/025* (2013.01); *H04W 76/046* (2013.01); *H04W 76/048* (2013.01); *H04W 76/06* (2013.01); *H04B 7/0456* (2013.01); *H04B 7/0639* (2013.01); *H04L 5/0007* (2013.01); *H04L 65/105* (2013.01); *H04L 65/1006* (2013.01); *H04W 36/14* (2013.01); *H04W 36/36* (2013.01); *H04W 36/38* (2013.01); *H04W 76/04* (2013.01); *H04W 76/041* (2013.01); *H04W 76/068* (2013.01); *H04W 84/045* (2013.01); *H04W 84/12* (2013.01); *H04W 88/02* (2013.01); *H04W 88/08* (2013.01); *H04W 92/20* (2013.01)

(58) Field of Classification Search
USPC .......................................... 455/458; 370/329
See application file for complete search history.

(56) References Cited

U.S. PATENT DOCUMENTS

| | | | |
|---|---|---|---|
| 2012/0264483 A1* | 10/2012 | Chin ..................... | H04W 68/00 455/552.1 |
| 2013/0003629 A1 | 1/2013 | Jeong et al. | |
| 2013/0015953 A1 | 1/2013 | Hsu et al. | |
| 2013/0301501 A1* | 11/2013 | Olvera-Hernandez | H04W 76/048 370/311 |
| 2014/0004850 A1* | 1/2014 | Kwon .................. | H04W 68/02 455/423 |
| 2015/0173039 A1* | 6/2015 | Rune ................. | H04W 52/0216 370/311 |

FOREIGN PATENT DOCUMENTS

| | | |
|---|---|---|
| WO | 2008155739 A2 | 12/2008 |
| WO | WO2009118640 A1 | 10/2009 |
| WO | WO2012064600 A1 | 5/2012 |

OTHER PUBLICATIONS

International Search Report and Written Opinion mailed Aug. 21, 2014 from International Application No. PCT/US2014/031509.
ZTE, "New SI Proposal: Study on RAN aspects of Machine-Type and other mobile data applications Communications enhancements," 3GPP TSG-RAN Meeting #59, RP-130396, Agenda Item: 13.2, Feb. 26-Mar. 1, 2013, Vienna, Austria, 5 pages.
3GPP, "Technical Specification Group Services and System Aspects; Machine-Type and other Mobile Data Applications Communications Enhancements (Release 12)," 3GPP TR 23.887 V0.8.0 (Feb. 2013), Lte, 107 pages.
3GPP, "Technical Specification Group Radio Access Network; Evolved Universal Terrestrial Radio Access (E-UTRA); User Equipment (UE) procedures in idle mode (Release 11)," 3GPP TS 36.304 V11.3.0 (Mar. 2013), Lte Advanced, 34 pages.
3GPP, "Technical Specification Group Radio Access Network; Evolved Universal Terrestrial Radio Access (E-UTRA); Physical Channels and Modulation (Release 11)," 3GPP TS 36.211 V11.2.0 (Feb. 2013), Lte Advanced, 109 pages.
3GPP, "Technical Specification Group Core Network and Terminals; Non-Access-Stratum (NAS) protocol for Evolved Packet System (EPS); Stage 3 (Release 11)," 3GPP TS 24.301 V11.6.0 (Mar. 2013), Lte Advanced, 345 pages.
3GPP, "Technical Specification Group Radio Access Network; Evolved Universal Terrestrial Radio Access (E-UTRA); Radio Resource Control (RRC); Protocol specification (Release 11)," 3GPP TS 36.331 V11.3.0 (Mar. 2013), Lte Advanced.
Office Action issued May 4, 2016 from Taiwan Patent Application No. 103112140, 12 pages.
Extended European Search Report dated May 16, 2017 from European Patent Application No. 14780270.6, 7 pages.

* cited by examiner

PAGING REPETITION FOR INCREASED ROBUSTNESS FOR EXTENDED PAGING CYCLES

CROSS REFERENCE TO RELATED APPLICATIONS

This application is a national phase entry under 35 U.S.C. §371 of International Application No. PCT/US2014/031509, filed Mar. 21, 2014, entitled "PAGING REPETITION FOR INCREASED ROBUSTNESS FOR EXTENDED PAGING CYCLES", which claims priority under 35 U.S.C. §119(e) to U.S. Provisional Patent Application No. 61/808,597 entitled "ADVANCED WIRELESS COMMUNICATION SYSTEMS AND TECHNIQUES," filed Apr. 4, 2013, the disclosures of which are incorporated herein by reference.

FIELD OF INVENTION

Embodiments of the present invention relate generally to the technical field of data processing, and more particularly, to devices adapted to operate in wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by the inclusion in this section.

In a wireless communication system, a user equipment ("UE") may operate on a cell provided by an access node. Accordingly, the access node may wish to transmit some data to the UE. Paging is a mechanism for the access node to notify the UE that the access node would like to transmit that data to the UE. For example, an access node may transmit system information and updates as well as other downlink traffic for the UE, such as a mobile originated conversational call.

The reliable reception of paging messages is paramount to the success and proper functionality of a UE in the wireless communication system. Unfortunately, a paging message may be lost due to varying wireless conditions, potential drift, or other factors that may adversely affect the ability of the UE to receive a paging message from the access node. Further, perpetually monitoring signals transmitted by the access node for a paging message intended for the UE may undesirably increase the power consumption of the UE.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
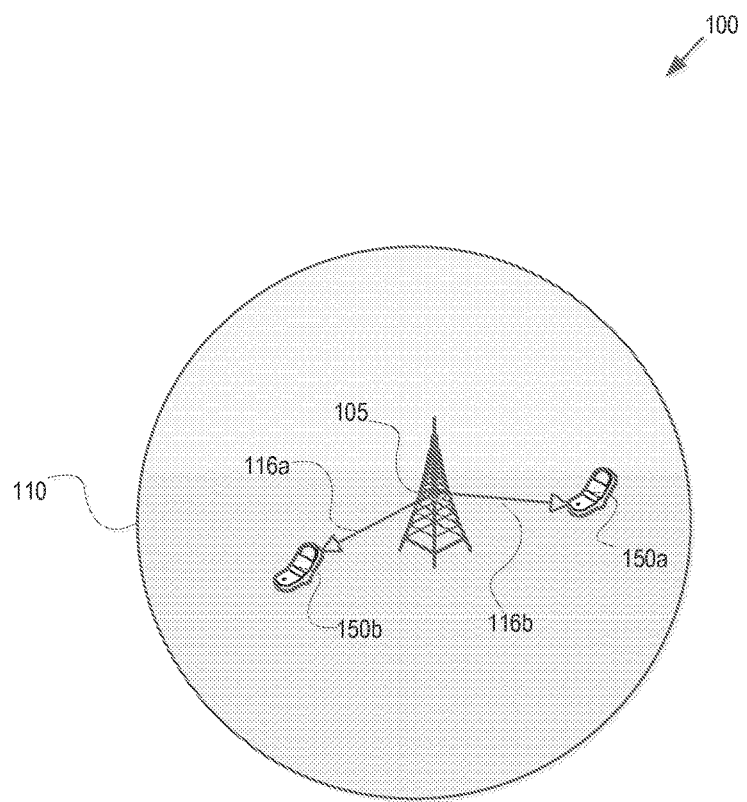
FIG. 1 is block diagram illustrating an exemplary wireless communication network having an access node that is to transmit a plurality of paging messages to a plurality of UEs, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or "B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable hardware components that provide the described functionality.

Embodiments described herein relate generally to paging messages and how a paging message may be robustly transmitted and received in a network. In a wireless network environment, a UE may "wake up" (e.g., transition from a low-power state to a high-power state) for a paging cycle so that the UE may receive a paging message from an access node. To reduce the number frequency with which a UE wakes up to receive a paging message during a paging cycle, the duration of the paging cycle for the UE may be extended. Based on the extended paging cycle, a UE operating in an idle mode may need to wake up less frequently to monitor for and receive a paging message.

In the wireless network environment, a paging message transmitted by an access node and intended for the UE may not be received by the UE (e.g., due to drift or network interference). Where the access node is able to determine that the paging message was not received by the UE (e.g., based on an absence of a confirmation from the UE that the paging message was received), the access node may retransmit the paging message to the UE. For a UE having an extended paging cycle, the delay between a first paging message and a retransmitted paging message may be unacceptably long, particularly because the extended paging cycle may be greater than an hour.

To prevent unacceptable delay in the delivery of a paging message to the UE, the number of paging opportunities (also known as paging occasions) that are to occur during an extended paging cycle may be increased. According to various embodiments, the access node may transmit to the UE an indication of a number of subframes in a paging frame within the extended paging cycle that are to be used for paging. Using the indication of the number of subframes and an index, the UE may access a lookup table that indicates the paging opportunities for the extended paging cycle. The paging opportunities may correspond to subframes of the paging frame that include a paging message. The UE may then detect the paging message in a respective subframe of the paging frame that corresponds with a paging opportunity. Thus, if the UE is unable to detect the first paging message in a subframe corresponding with the first paging opportunity, there may be at least one more paging opportunity for the UE to detect the paging message.

FIG. 1 illustrates an exemplary wireless network environment 100, according to one embodiment. In embodiments, the wireless network environment 100 may be or may include a frequency division duplex ("FDD") network The wireless network environment 100 may include a plurality of UEs 150 that may be adapted to operate in a wireless network. UEs 150 may operate on a wireless cell 110 provided by an access node 105. According to embodiments, a UE 150 may be any device adapted to communicatively connect with the access node 105 according to, for example, one or more 3GPP technical specifications. In some embodiments, a UE 150 may be a hand-held telephone, a laptop computer, or other similar device equipped with a mobile broadband adapter. Therefore, a UE 150 may be adapted to administrate one or more tasks in the environment 100, including mobility management, call control, session management, and identity management. In various embodiments, one or both of the UEs 150a-b may be machine-type communication devices. Additionally, one or both of the UEs 150a-b may be delay tolerant, and may so indicate to the access node (e.g., at a setup stage of a radio connection). In embodiments, a first UE 150a may be a delay-tolerant, machine-type communication device, while a second UE 150b may be a non-machine-type communication device.

The access node 105 may be, for example, a node B, such as an evolved Node B, a low-power radio access node adapted to provide a small cell, or essentially any other node adapted to provide a wireless cell to a UE 150. To communicate data to a UE 150, the access node 105 may broadcast a transmission 116 to a UE 150. The transmission 116 may be comprised of a plurality of frames, at least one of which may be a paging frame. A paging frame may include a paging message at a plurality of subframes that are included in the paging frame.

The access node 105 may broadcast a transmission 116 to a UE 150 using a physical downlink shared channel ("PDSCH"). The PDSCH usually represents fifty-five (55) to eighty-nine (89) percent of the resource elements associated with a transmission 116, depending on the number of orthogonal frequency-division multiple access ("OFDMA") symbols allocated to the PDSCH, the total bandwidth of the network in which the access node 105 and UEs 150a-b are operating, and the number of transmit antenna ports at the access node 105. The PDSCH is shared for the system information block ("SIB"), paging messages, radio resource control ("RRC") signaling message, and application data transmission. Additionally, the PDSCH has a relatively high capacity (e.g., a relatively large number of resource elements) and, therefore, may accommodate a relatively large paging capacity.

The increased paging capacity of the PDSCH of a transmission 116 may decrease the PDSCH for other transmissions. Quadrature phase shift keying ("QPSK") modulation may be used for a transmission 116 having one or more paging messages so that a low data rate may enable the reception of the one or more paging messages by a UE 150 through the wireless cell 110. The size of the transport block related to the one or more paging messages in a transmission 116 is variable and may depend on the content of the one or more paging messages (e.g., the number of paging records, the inclusion of a system information tag, and/or an earthquake and tsunami warning system ("ETWS") or commercial mobile alert system ("CMAS") indication).

In a transmission 116, a single RRC paging message may accommodate up to, for example, sixteen (16) paging records where each paging record carries a paging message for a different UE 150. Therefore, in such an embodiment, up to, for example, sixteen UEs 150a-b can be paged by the access node 105 using a single subframe of a paging frame in a transmission 116. A transmission 116 having an RRC paging message may be broadcast by the access node 105 using transparent mode radio link control mode. If a UE 150 receives the transmission 116 with an error related to the paging message (or fails to receive the transmission 116), the latency between a second transmission of the paging message may be unacceptably high. Therefore, the access node 105 may include a plurality of paging messages for a UE 150 in a transmission 116, such as in a plurality of subframes comprising a paging frame.

Correspondingly, when a UE 150 wakes up to detect a paging message in a transmission 116 at designated paging opportunities, the UE 150 may check for additional paging messages in other subframes of the paging frame. The additional checks may be especially germane to a UE 150 that is using an extended paging cycle. In various embodiments, the number of paging opportunities for a UE 150 may vary depending on the length of the paging cycle—e.g., a longer extended paging cycle may include a greater number of paging opportunities per paging frame. For example, for a UE 150 having an extended paging cycle, a transmission 116 may include a paging message in the subframes zero (0), four (4), five (5), and/or nine (9) of the paging frame.

Figure 2:
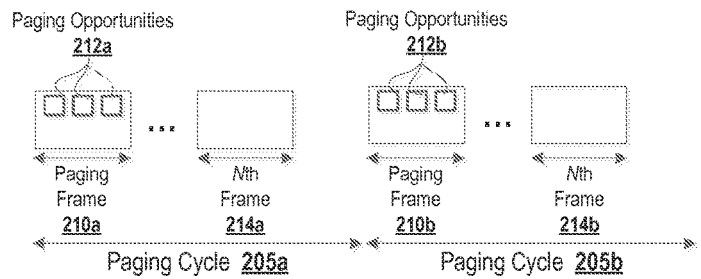
FIG. 2 is a block diagram illustrating a plurality of paging frames that are each to include a plurality of paging opportunities during respective paging cycles, in accordance with various embodiments.

Turning now to FIG. 2, a block diagram illustrates a plurality of paging frames 210a-b that are to include a plurality of paging opportunities 212a-b during respective paging cycles 205a-b, in accordance with various embodiments. During each paging cycle 205, an access node may transmit to a UE a paging message at a predetermined subframe of a predetermined frame (e.g., a paging frame); this predetermined subframe may represent a paging opportunity (or paging occasion). According to various embodiments, a paging cycle 205 may be an extended paging cycle. For example, a paging cycle 205 may have a duration that is slightly longer than a 2.56 second cycle—e.g., a few minutes or even up to an hour. In another embodiment, a paging cycle 205 may have a duration that is greater than an hour, or even several hours. Information related to a paging cycle 205 (e.g., timing information) may be transmitted from an access node to a UE, such as in a system information block 2.

A UE that is to receive the plurality of frames 210a-b, 214a-b during the paging cycles 205a-b may do so using a discontinuous receive ("DRX") cycle. For example, a UE may be in a low-power state prior to the first paging cycle 205a and between the first paging cycle 205a and the second paging cycle 205b. However, the UE may transition to a high-power state for the first paging cycle 205a and the second paging cycle 205b so that the plurality of frames 210a-b, 214a-b may be monitored for identification information for the UE, such as a paging radio network temporary identity ("P-RNTI"), an international mobile subscriber identity ("IMSI"), and/or a temporary mobile subscriber identity ("TMSI").

According to various embodiments, a paging frame 210 transmitted to a UE during a paging cycle 205 may include a plurality of paging opportunities 212. The UE may calculate when these paging opportunities 212 are to occur based on, for example, timing information associated with a subframe of a paging frame 210. Therefore, a UE may have a plurality of paging opportunities 212 during a paging cycle 205 to receive a paging message from an access node. Thus, if a UE is to unable to receive a first paging message at first paging opportunity from an access node, the UE may be able to receive a subsequent paging message at a subsequent paging opportunity from that access node without waiting for a subsequent paging cycle (which might cause the paging message to be unacceptably delayed).

Figure 3:
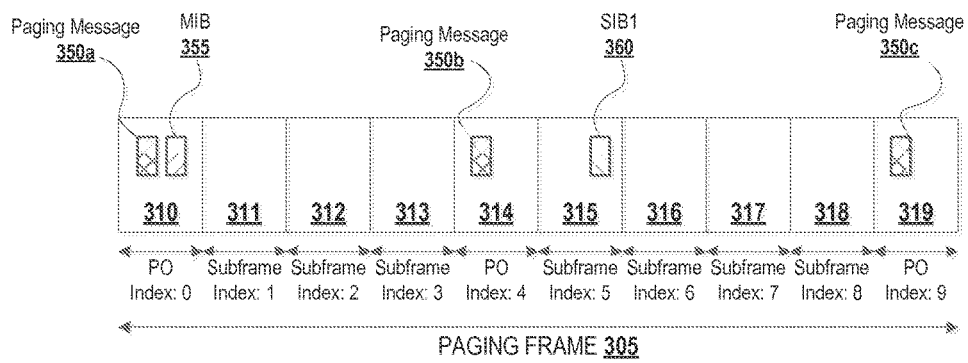
FIG. 3 is a block diagram illustrating an embodiment of a paging frame having a plurality of subframes in which a paging message may be included, in accordance with various embodiments.

With respect to FIG. 3, a block diagram is shown illustrating a paging frame 305 having a plurality of subframes 310-319 in which a paging message 350 may be included, in accordance with various embodiments. The paging frame 305 may be of a type broadcast in an FDD system. In the illustrated embodiment, an access node may include the paging message 350 for a UE in three subframes 310, 314, 319 of the paging frame 305. Additionally, the paging frame 305 may include other data that is germane to the operation of the UE on a cell provided by the access node. For example, a master information block ("MIB") 355 may be included in the subframe 310 with index 0 and a system information block 1 ("SIB1") 360 may be included in the subframe 315 with index 5.

In the illustrated embodiment, an access node may include a paging message 350 in a subframe 310 with index 0 where the traffic and/or capacity of a cell provided by the access node are relatively high. In similar embodiments where the traffic and/or capacity of a cell provided by the access node are relatively high, an access node may include a paging message 350 in a subframe 315 with index 5. In some embodiments, an access node may include a paging message 350 in a subframe 314 with index 4 or a subframe 319 with index 9 where the traffic and/or capacity of a cell provided by the access node are relatively low because these subframes 314, 319 are proximate to the subframe 310 with index 0 and the subframe 315 with index 5, which carry the synchronization signals. This may allow a UE to efficiently detect a paging message 350 contemporaneously with a check for one or more synchronization signals (e.g., during the same wake-up period). Furthermore, the inclusion of a paging message 350 in a subframe 310 with index 0 may reduce the impact on a multi-broadcast single frequency network ("MBSFN"), because the MBSFN cannot use the same subframes as paging messages nor can the MBSFN use the same subframes as the MIB and SIB1.

Although illustrated at three subframes 310, 314, 319, a paging message 350 may be included in any of the subframes 310-319 of the paging frame 305. In various embodiments, a paging message 350 may be included in both subframes which may be used by the access node for relatively high cell traffic and/or capacity (e.g., the subframe 310 with index 0 and the subframe 315 with index 5) as well as subframes which may be used by the access node for relatively low cell traffic and/or capacity (e.g., the subframe 314 with index 4 and the subframe 319 with index 9). For example, a paging frame may include a paging message 350a in the subframe 310 with index 0; concurrently, a paging message 350b may be included in the subframe 314 with index 4 and a paging message 350c may be included in the subframe 319 with index 9.

A UE may receive the paging frame 305 and, accordingly, would have three paging opportunities to receive the paging message 350: the subframe 310 with index 0, the subframe 314 with index 4, and the subframe 319 with index 9. The UE may compute these paging opportunities 0, 4, and 9 by accessing a lookup table based on an index and an indication of a number of subframes in the paging frame 305 that may be used for paging (e.g., an indication received from the access node that is to transmit the paging frame 305). The UE would then know to monitor (e.g., wake up for) paging opportunities 0, 4, and 9 at the respective subframes 310, 314, 319 having those indices. The UE would then be able to contemporaneously check a synchronization signal (e.g., during a same wake-up period which the paging messages are to be detected). In various embodiments, the paging message 350 may be included in the three subframes 310, 314, 319 where the UE is delay tolerant and the extended paging cycle is greater than one (1) hour.

Figure 4:
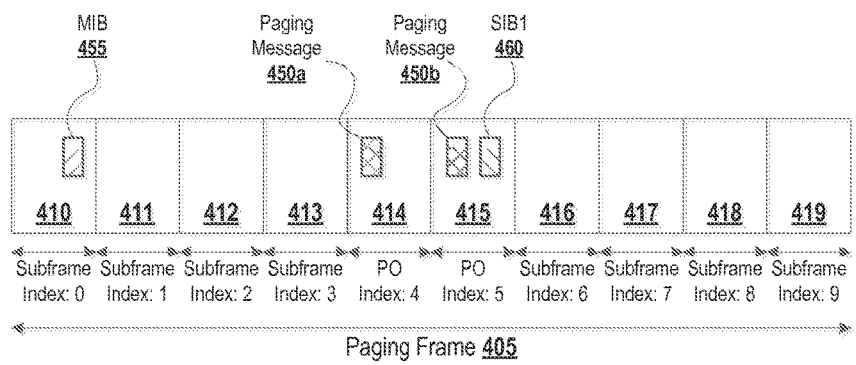
FIG. 4 is a block diagram illustrating another embodiment of a paging frame having a plurality of subframes in which a paging message may be included, in accordance with various embodiments.

With reference to FIG. 4, a block diagram is shown illustrating a paging frame 405 having a plurality of subframes 410-419 in which a paging message 450 may be included, in accordance with various embodiments. In the illustrated embodiment, an access node may include a paging message 450 for a UE in two subframes 410, 415 of a paging frame 405. Additionally, the access node may include other data that is germane to the operation of the UE on a cell provided by the access node. For example, an MIB 455 may be included in the subframe 410 with index 0 and a SIB1 460 may be included in the subframe 415 with index 5.

Although illustrated at two subframes 410, 415 a paging message 450 may be included in any of the subframes 410-419 of the paging frame 405. A UE may receive the paging frame 405 and, accordingly, would have two paging opportunities to receive the paging message 450: the subframe 410 with index 0 and the subframe 415 with index 5. The UE may compute these paging opportunities 0 and 5 by accessing a lookup table based on an index and an indication of a number of subframes in the paging frame 405 that may be used for paging. The UE would then know to monitor (e.g., wake up for) paging opportunities 0 and 5 at the respective subframes 410, 415 having those indices. In various embodiments, the paging message 450 may be included in the two subframes 410, 415 where the UE is delay tolerant and the extended paging cycle is greater than 2.56 seconds and less than or equal to one (1) hour.

Figure 5:
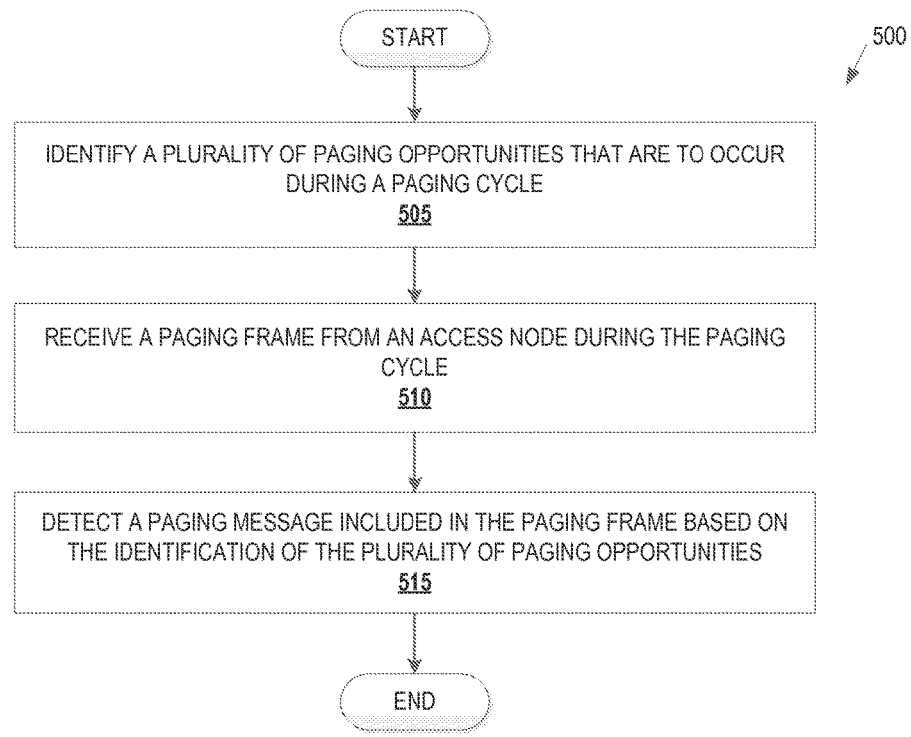
FIG. 5 is a flow diagram illustrating a method for detecting a paging message based on the identification of a plurality of paging opportunities for the paging message, in accordance with various embodiments.

With respect to FIG. 5, a flow diagram is shown illustrating a method 500 for detecting a paging message based on the identification of a plurality of paging opportunities for the paging message, in accordance with various embodiments. The method 500 may be performed by a UE 150 illustrated in FIG. 1. While FIG. 5 illustrates a plurality of sequential operations, one of ordinary skill would understand that one or more operations of the method 500 may be transposed and/or performed contemporaneously.

The method 500 may begin with a first operation 505 of identifying a plurality of paging opportunities that are to occur during a paging cycle, such as an extended paging cycle. During a paging cycle, an operation 510 for receiving a paging frame may be performed. The paging frame may be comprised of subframes having respective indices; a respective paging opportunity of the plurality may correspond with a respective index of a subframe.

With the paging framed received, the method 500 may advance to operation 515 for detecting the paging message in the paging frame. The detecting of the paging message in the paging frame may be based on the identifying of the plurality of paging opportunities. In various embodiments, a paging message may need to be received in a timely manner. However, the duration of the paging cycle may be of a duration such that the retransmission of the paging message during a subsequent paging cycle may unsatisfactorily delay the paging message. Because a plurality of paging opportunities to detect the paging message is identified for a single paging cycle, the paging message may be more likely to be detected. For example, if a paging message at the first paging opportunity is not detected (e.g., through error or other reception issue), a subsequent paging opportunity may occur at which the paging message may be detected. Accordingly, a paging message may be more reliably received, especially in wireless networking environments using extended DRX cycles.

Figure 6:
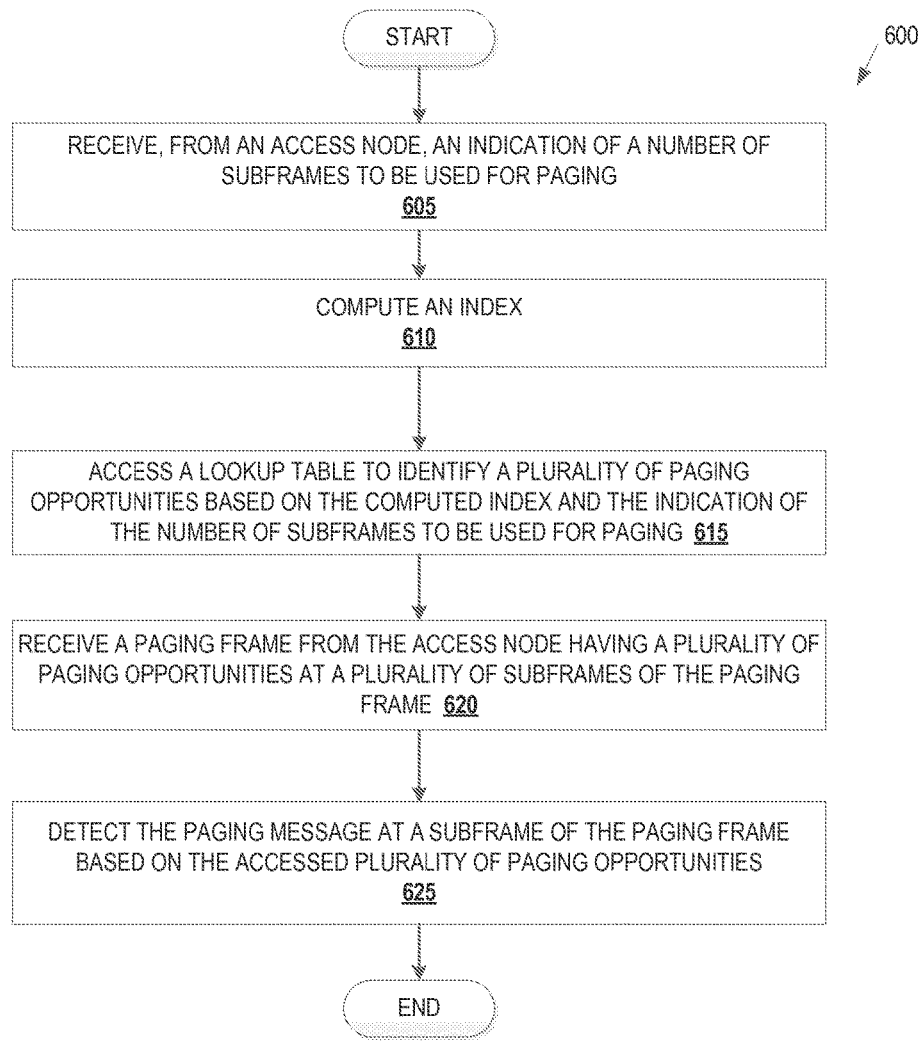
FIG. 6 is a flow diagram illustrating a method for computing a plurality of paging opportunities and detecting a paging message in a subframe of a paging frame based on the computed plurality of paging opportunities, in accordance with various embodiments.

With respect to FIG. 6, a flow diagram is shown illustrating a method 600 for computing a plurality of paging opportunities and detecting a paging message in a subframe of a paging frame based on the computed plurality of paging opportunities, in accordance with various embodiments. The method 600 may be performed by a UE 150 illustrated in FIG. 1. While FIG. 6 illustrates a plurality of sequential operations, one of ordinary skill would understand that one or more operations of the method 600 may be transposed and/or performed contemporaneously.

Starting with operation 605, the method 600 may include receiving an indication of a number of subframes to be used for paging ("nB"). This indication nB may be received from an access node that is adapted to provide a wireless cell and, correspondingly, transmit data related to operating on that wireless cell. This indication nB may be received as a broadcast in the system information block 2 ("SIB2") and may be a value that is a multiple of a DRX paging cycle length in radio frames ("T")—e.g., the indication nB may be 4T, 2T, T, T/2, T/4, T/8, T/16, or T/32. The number of subframes in a paging frame that are to be used for paging ("Ns") may then be computed as the maximum of 1 and nB/T.

The method 600 may include an operation 610 for computing an index ("i_s"). In various embodiments, the index i_s may be computed from three values: the number of paging frames within a paging cycle ("N"), number of subframes in a paging frame that are to be used for paging Ns, and an identification of a UE ("UE_ID") (e.g., the UE performing the method 600). N may be computed as the minimum of T and nB and UE_ID may be computed as an IMSI modulo 1024 (e.g., the IMSI of a UE performing the method 600). The index i_s may subsequently be computed as $\lfloor UE\_ID/N \rfloor$ % Ns.

Subsequently, the method 600 may reach an operation 615 for accessing a lookup table to identify a plurality of paging opportunities. The plurality of paging opportunities may be identified based on the indication of the number of subframes used for paging nB (used to compute the number of subframes used for paging Ns) and the computed index i_s. In various embodiments, the number of subframes to be used for paging Ns (computed from the indication of the number of subframes to be used for paging nB) and the computed index i_s provide coordinates to access an entry in the lookup table, and the accessed entry in the lookup table may include the paging opportunities.

The lookup table that is to be accessed may vary according to the embodiment. For example, if the paging cycle is not extended (e.g., the paging cycle is less than or equal to 2.56 seconds), the lookup table may include single entries:

|    | i_s |     |     |     |
|----|-----|-----|-----|-----|
| Ns | 0   | 1   | 2   | 3   |
| 1  | 9   | N/A | N/A | N/A |
| 2  | 4   | 9   | N/A | N/A |
| 4  | 0   | 4   | 5   | 9   |

In another embodiment, the paging cycle may be of an extended duration greater than 2.56 seconds but less than or equal to one hour. In such an embodiment, a device (e.g., a UE) that is to access the lookup table may need to be delay tolerant. Here, the lookup table may include two entries (i.e., two paging opportunities) for each coordinate (i_s, Ns). In various embodiments, the number of subframes in a paging frame that are to be used for paging Ns may be bound to the values of two (2) or four (4) based on the length of the paging cycle.

|     | i_s  |      |      |      |
| --- | ---- | ---- | ---- | ---- |
| Ns  | 0    | 1    | 2    | 3    |
| 2   | 4, 9 | 4, 9 | N/A  | N/A  |
| 4   | 9, 0 | 4, 5 | 4, 5 | 9, 0 |

In a third embodiment, the paging cycle may be of an extended duration greater than greater than one hour. In such an embodiment, a device (e.g., a UE) that is to access the lookup table may need to be delay tolerant. Here, the lookup table may include three entries (i.e., three paging opportunities) for each coordinate ($i\_s$, Ns). In various embodiments, the number of subframes in a paging frame that are to be used for paging Ns may be bound to the value four (4) based on the length of the paging cycle.

|     | i_s     |         |         |         |
| --- | ------- | ------- | ------- | ------- |
| Ns  | 0       | 1       | 2       | 3       |
| 4   | 4, 9, 0 | 4, 5, 9 | 5, 9, 0 | 0, 4, 5 |

During a paging cycle, the method 600 may include an operation 620 for receiving a paging frame from an access node. The paging frame may include a plurality of paging opportunities, such as subframes of the paging frame that correspond with the identified paging opportunities. The operation 620 may include detecting the paging message at a subframe of the paging frame based on the accessed plurality of paging opportunities. In various embodiments, a paging opportunity of the plurality may correspond to an index of a subframe of the received paging frame. Accordingly, a subframe having the index corresponding with the plurality may be monitored for the paging message. The identified plurality of paging opportunities increases the likelihood of detecting the paging message during the paging cycle. Therefore, if there is an error detecting a paging message at a first paging opportunity, a second paging opportunity may occur at which the paging message may be detected. For example, if there is an error detecting a paging message at the subframe having the index 4 (corresponding with the identified paging opportunity 4), then the next subframe corresponding with the next identified paging opportunity (e.g., the subframe having the index 9 corresponding with the paging opportunity 9) may be monitored for the paging message.

Figure 7:
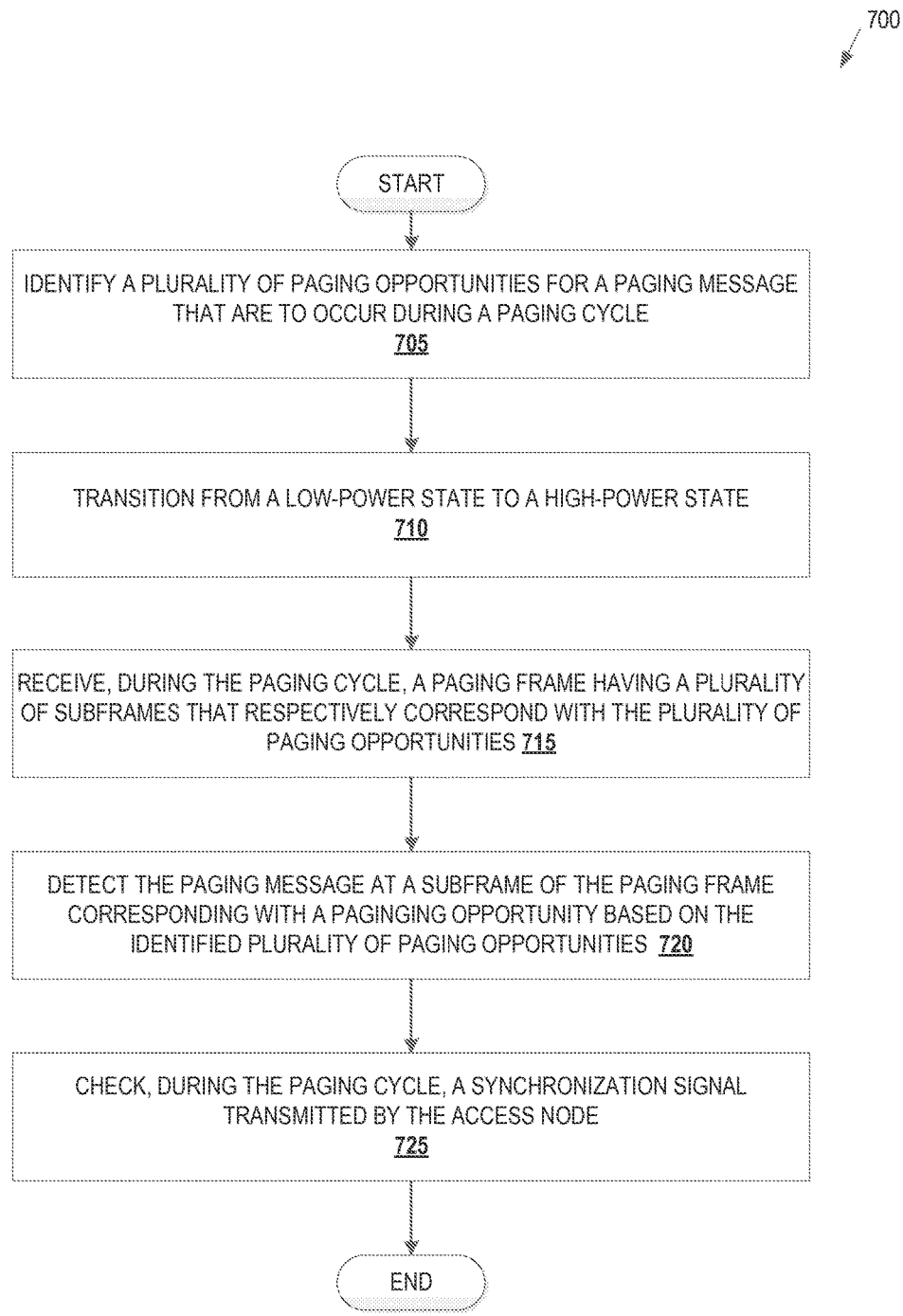
FIG. 7 is a flow diagram illustrating a method for transitioning from a low-power state to a high-power state and detecting a paging message and checking a synchronization signal while in the high-power state, in accordance with various embodiments.

Turning to FIG. 7, a flow diagram illustrates a method 700 for transitioning from a low-power state to a high-power state and detecting a paging message and checking a synchronization signal while in the high-power state, in accordance with various embodiments. The method 700 may be performed by a UE 150 illustrated in FIG. 1. While FIG. 7 illustrates a plurality of sequential operations, one of ordinary skill would understand that one or more operations of the method 700 may be transposed and/or performed contemporaneously.

The method 700 may begin with a first operation 705 of identifying a plurality of paging opportunities that are to occur during a paging cycle, such as an extended paging cycle. To conserve power, a device performing the method 700 may operate in an idle mode and "wake up" (e.g., transition to a high-power state) less frequently; particular power conservation may be realized during extended paging cycles. Accordingly, during the paging cycle, an operation 710 for transitioning from a low-power state to a high-power state may be performed. According to various embodiments, a device may need to be in a high-power state to perform certain operations.

The operation 715 may include receiving a paging frame during the paging cycle. The paging frame may be comprised of subframes having respective indices; a respective paging opportunity of the plurality may correspond with a respective index of a subframe. Subsequently, the operation 720 may include detecting the paging message at a subframe of the paging frame based on the identified plurality of paging opportunities. According to various embodiments, a respective paging opportunity corresponds to a respective subframe of the paging frame. Therefore, only a subframe corresponding with a respective paging opportunity may need to be monitored to detect a paging message. Further, any remaining subframes corresponding with respective paging opportunities may not need to be monitored to detect a paging message once the paging message has been successfully detected.

In addition to detecting the paging message, the method 700 may include an operation 725 for detecting one or more synchronization signals. One or more synchronization signals may be carried in subframes zero (0) and/or five (5), which may be proximate to one or more subframes corresponding with one or more paging opportunities. Therefore, the operation 720 for detecting the paging message and the operation 725 may be performed in the same high-power state transition. Subsequently, the method 700 may include an operation (not shown) for transitioning from the high-power state back to the low-power state.

Figure 8:
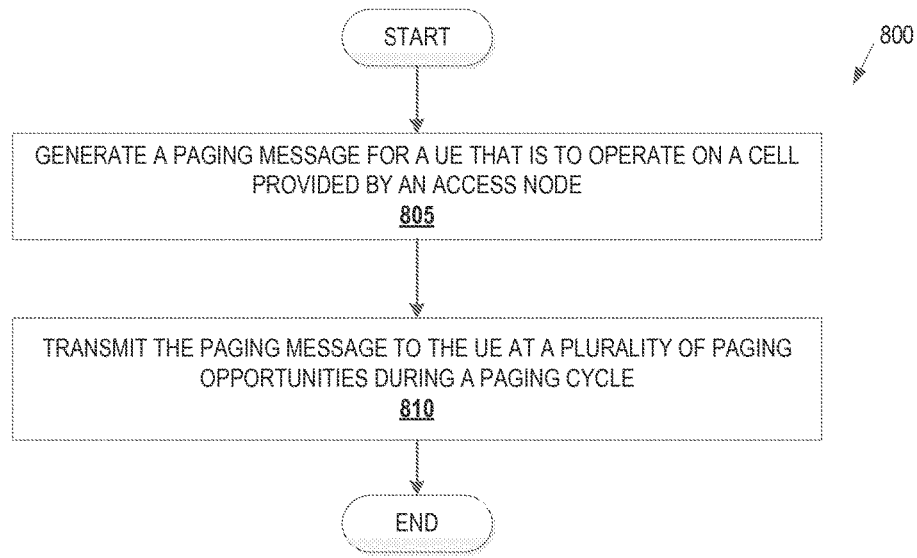
FIG. 8 is a flow diagram illustrating a method for transmitting a paging message to a UE at a plurality of paging opportunities, in accordance with various embodiments.

Turning to FIG. 8, a flow diagram illustrates a method 800 for transmitting a paging message to a UE at a plurality of paging opportunities, in accordance with various embodiments. The method 800 may be performed by the access node 105 illustrated in FIG. 1. While FIG. 8 illustrates a plurality of sequential operations, one of ordinary skill would understand that one or more operations of the method 800 may be transposed and/or performed contemporaneously.

Beginning at operation 805, the method 800 may include an operation for generating a paging message for a UE. The UE may operate on a cell provided by an access node (e.g., the access node that is to generate the paging message). The paging message may be generated based on, for example, a message received from a mobility management entity ("MME") having some data for the UE. Accordingly, the paging message may be addressed to the UE using, for example, a P-RTNI, an IMSI, and/or a TMSI.

Subsequently, operation 810 may include transmitting the generated paging message to the UE. The generated paging message may be transmitted to the UE during an extended paging cycle, such as an extended DRX paging cycle, that may have a duration greater than 2.56 seconds or even greater than one hour. Therefore, to reduce the probability that the UE will fail to receive the paging message, the paging message may be transmitted at a plurality of paging opportunities which the UE may be adapted to monitor. In various embodiments, a respective paging opportunity of the plurality may correspond to a respective subframe of a paging frame to be transmitted to the UE. Therefore, the generated paging message may appear in a plurality of different subframes of a paging frame, such as subframes with indices zero (0), four (4), five (5), and/or nine (9).

Figure 9:
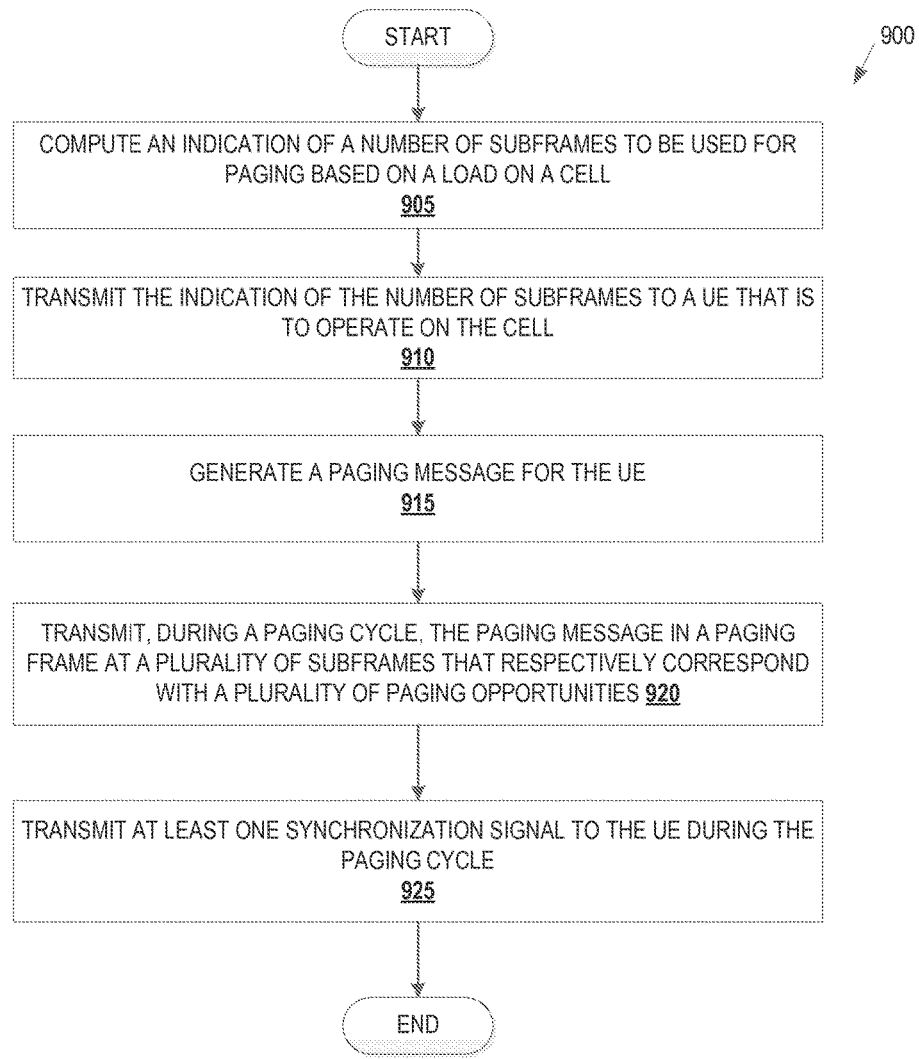
FIG. 9 is a flow diagram illustrating a method for transmitting, to a UE, a paging frame having a plurality of subframes that respectively correspond to a plurality of paging opportunities and respectively include a paging message for the UE, in accordance with various embodiments.

In reference to FIG. 9, a flow diagram shows a method for transmitting, to a UE, a paging frame having a plurality of subframes that respectively correspond to a plurality of paging opportunities and respectively include a paging message for the UE, in accordance with various embodiments. The method 900 may be performed by the access node 105 illustrated in FIG. 1. While FIG. 9 illustrates a plurality of sequential operations, one of ordinary skill would understand that one or more operations of the method 900 may be transposed and/or performed contemporaneously.

Initially, the method 900 may start with an operation 905 for computing an indication of a number of subframes to be used for paging. The number of subframes may be included in a single paging frame that is to be transmitted to a UE at least once during paging cycle. In various embodiments, the indication of the number of subframes to be used for paging may be specific to a cell (e.g., a cell provided by an access node performing the method 900). In further embodiments, the indication of the number of subframes to be used for paging may be based on a paging cycle length for that cell in radio frame ("T") and may be a multiple of the paging cycle length in radio frames for that cell T (e.g., 4T, 2T, T, T/2, T/4, T/8, T/16, or T/32). Subsequently, the method 900 may reach an operation 910 for transmitting the indication of the number of subframes to be used for paging T to a UE that is to operate on the cell. Therefore, the UE may be able to compute the paging opportunities at which a paging message may be transmitted to the UE.

An operation 915 may include generating a paging message for the UE. This generated paging message for the UE may include an identification of the UE, such as a P-RNTI, IMSI, and/or TMSI. With the paging message generated, the method 900 may proceed to an operation 920 for transmitting the paging message to the UE. The paging message may be transmitted to the UE in a paging frame during an extended DRX paging cycle. To decrease the probability that the UE will be unable to receive the paging message during the extended DRX paging cycle, the paging message may be transmitted to the UE in a plurality of subframes of the paging frame, such that a respective subframe of the plurality of subframes having the paging message may correspond with a paging opportunity for the UE.

In addition to an operation 920 for transmitting the paging message, an operation 925 may include transmitting at least one synchronization signal to the UE. The at least one synchronization signal may allow the UE to camp on the cell so that the UE may receive the paging message (e.g., by synchronizing timing so that the subframes corresponding with paging opportunities may be monitored). In various embodiments, the at least one synchronization signal may be transmitted in a same subframe as the paging message, such as a subframe with index zero (0) or a subframe with index five (5). Alternatively, the at least one synchronization signal may be transmitted in a subframe proximate to a subframe having the paging message—e.g., a subframe with an index zero (0) where the paging message may be included in a subframe with index nine (9) or a subframe with index five (5) where the paging message may be included in a subframe with index four (4).

Figure 10:
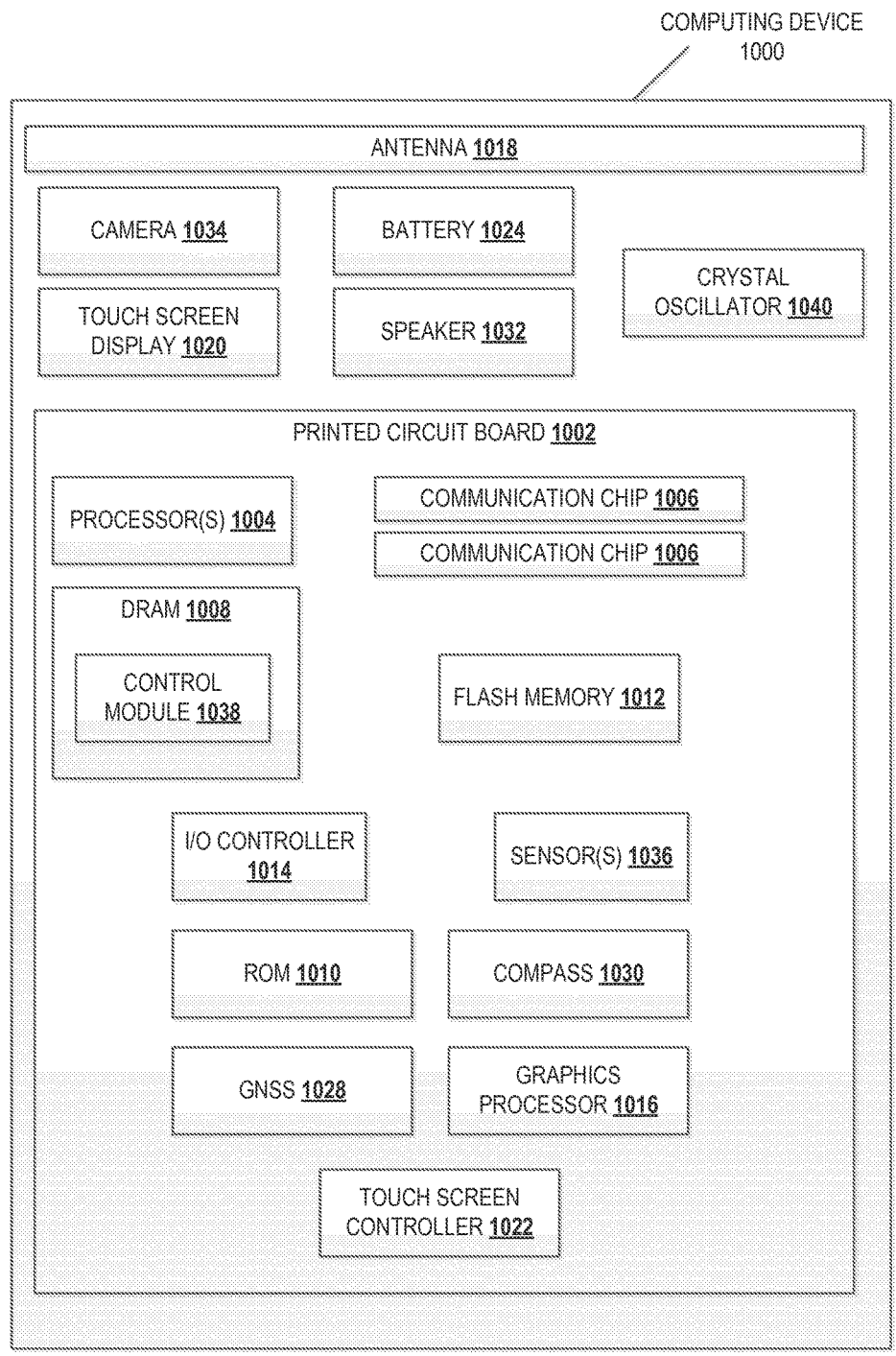
FIG. 10 is a block diagram of a computing device adapted to operate in a wireless communication network, in accordance with various embodiments.

With respect to FIG. 10, a block diagram illustrates an example computing device 1000, in accordance with various embodiments. An access node 105 and/or a UE 150 of FIG. 1 and described herein may be implemented on a computing device such as computing device 1000. Further, the computing device 1000 may be adapted to perform one or more operations of the method 500 described with respect to FIG. 5, the method 600 described with respect to FIG. 6, the method 700 described with respect to FIG. 7, the method 800 described with respect to FIG. 8, and/or the method 900 described with respect to FIG. 9. The computing device 1000 may include a number of components, one or more processor 1004 and at least one communication chips 1006. Depending upon the embodiment, one or more of the enumerated components may comprise "circuitry" of the computing device 1000, such as processing circuitry, communication circuitry, and the like. In various embodiments, the one or more processor(s) 1004 each may be a processor core. In various embodiments, the at least one communication chips 1006 may be physically and electrically coupled with the one or more processor(s) 1004. In further implementations, the communication chips 1006 may be part of the one or more processor(s) 1004. In various embodiments, the computing device 1000 may include a printed circuit board ("PCB") 1002. For these embodiments, the one or more processors 1004 and communication chip 1006 may be disposed thereon. In alternate embodiments, the various components may be coupled without the employment of the PCB 1002.

Depending upon its applications, the computing device 1000 may include other components that may or may not be physically and electrically coupled with the PCB 1002. These other components include, but are not limited to, volatile memory (e.g., dynamic random access memory 1008, also referred to as "DRAM"), non-volatile memory (e.g., read only memory 1010, also referred to as "ROM"), flash memory 1012, an input/output controller 1014, a digital signal processor (not shown), a crypto processor (not shown), a graphics processor 1016, one or more antenna(s) 1018, a display (not shown), a touch screen display 1020, a touch screen controller 1022, a battery 1024, an audio codec (not shown), a video code (not shown), a global navigation satellite system 1028, a compass 1030, an accelerometer (not shown), a gyroscope (not shown), a speaker 1032, a camera 1034, one or more sensors 1036 (e.g., a barometer, Geiger counter, thermometer, viscometer, rheometer, altimeter, or other sensor that may be found in various manufacturing environments or used in other applications), a mass storage device (e.g., a hard disk drive, s solid state drive, compact disk and drive, digital versatile disk and drive, etc.) (not shown), and the like. In various embodiments, the one or more processor(s) 1004 may be integrated on the same die with other components to form a system on a chip ("SOC").

In various embodiments, volatile memory (e.g., DRAM 1008), non-volatile memory (e.g., ROM 1010), flash memory 1012, and the mass storage device (not shown) may include programming instructions configured to enable the computing device 1000, in response to the execution by one or more processors 1004, to practice all or selected aspects of the data exchanges and methods described herein, depending on the embodiment of the computing device 1000 used to implement such data exchanges and methods. More specifically, one or more of the memory components (e.g., DRAM 1008, ROM 1010, flash memory 1012, and the mass storage device) may include temporal and/or persistent copies of instructions that, when executed by one or more processors 1004, enable the computing device 1000 to operate one or more modules 1038 configured to practice all or selected aspects of the data exchanges and method described herein, depending on the embodiment of the computing device 1000 used to implement such data exchanges and methods.

The communication chips 1006 may enable wired and/or wireless communication for the transfer of data to and from the computing device 1000. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 1006 may implement any of a number of wireless standards or protocols, including but not limited to Long Term Evolution ("LTE"), LTE Advanced ("LTE-A"), Institute of Electrical and Electronics Engineers ("IEEE") 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data Rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as other wireless protocols that are designated as 3G, 4G, 5G, and beyond. The computing device 1000 may include a plurality of communication chips 1006 adapted to perform different communication functions. For example, a first communication chip 1006 may be dedicated to shorter range wireless communications, such as Wi-Fi and Bluetooth, whereas a second communication chip 1006 may be dedicated to longer range wireless communications, such as GPS, EDGE, GPRS, CDMA, WiMAX, LTE, LTE-A, Ev-DO, and the like.

In various embodiments, the computing device 1000 may include a crystal oscillator 1040. The crystal oscillator 1040 may be communicatively coupled with the communication chip(s) 1006 and/or other communication circuitry. The crystal oscillator may use mechanical resonance of vibrating crystal (e.g., of piezoelectric material) to create an electrical signal with a very precise frequency. Thus, the crystal oscillator 1040 may be used to generate signals that are transmitted by a UE.

In various implementations, the computing device 1000 may be a laptop, netbook, a notebook computer, an ultrabook computer, a smart phone, a computing tablet, a personal digital assistant ("PDA"), an ultra mobile personal computer, a mobile phone, a desktop computer, a server, a printer, a scanner, a monitor, a set-top box, an entertainment control unit (e.g., a gaming console), a digital camera, a portable digital media player, a digital video recorder, and the like. In further embodiments, the computing device 1000 may be another other electronic device that processes data.

Figure 11:
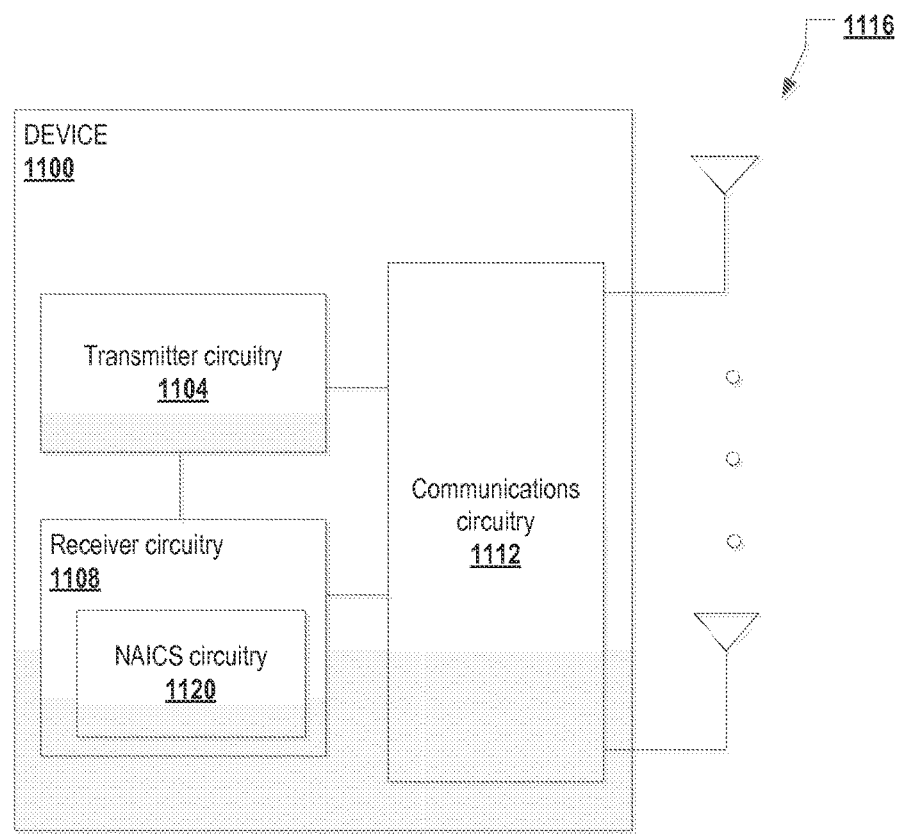
FIG. 11 is a block diagram of a transmitting device, in accordance with various embodiments.

FIG. 11 illustrates a device 1100 in accordance with some embodiments. The device 1100 may be similar to, and substantially interchangeable with a UE 150 and/or access node 105 of FIG. 1. The device 1100 may include transmitter circuitry 1104, processing circuitry 1108, communication circuitry 1112, and one or more antennas 1116 coupled with each other at least as shown.

Briefly, the communication circuitry 1112 may be coupled with the antennas to facilitate over-the-air communication of signals to/from the device 1100. Operations of the communication circuitry 1112 may include, but is not limited to, filtering, amplifying, storing, modulating, demodulating, transforming, etc.

The transmitter circuitry 1104 may be coupled with the communication circuitry 1112 and may be configured to provide signals to the communication circuitry 1112 for transmission by the antennas 1116. In various embodiments, the transmitter circuitry 1104 may be configured to provide various signal processing operations on the signal to provide the signal to the communication circuitry with appropriate characteristics.

The processing circuitry 1108 may be coupled with the communication circuitry 1112 and may be configured to receive signals from the communication circuitry 1112 for transmission by the communication circuitry 1112. In some embodiments, the processing circuitry 1108 may be adapted to generate signals. Further, the processing circuitry 1108 may be adapted to scramble, multiplex, and/or modulate various signals prior to transmission by the communication circuitry 1112.

Some or all of the communication circuitry 1112, transmitter circuitry 1104, and/or the processing circuitry 1108 may be included in, for example, a communication chip and/or communicatively coupled with a printed circuit board as described with respect to FIG. 10.

In various embodiments, example 1 may include an apparatus to be included in a user equipment ("UE"), the apparatus comprising: communications circuitry to receive at least one paging message included in a paging frame during a paging cycle associated with operation of the UE on a cell provided by an access node; and processing circuitry, communicatively coupled with the communications circuitry, to identify a plurality of paging opportunities that are to occur during the paging cycle, and to detect the paging message in the paging frame based on the identification of the plurality of paging opportunities. Example 2 may include the apparatus of claim 1, wherein the communications circuitry is further to receive, during the paging cycle, the paging frame having a plurality of subframes that respectively correspond with the plurality of paging opportunities, wherein each of the plurality of subframes includes the paging message. Example 3 may include the apparatus of claim 2, wherein the communications circuitry is to receive the paging frame using a physical downlink shared channel. Example 4 may include the apparatus of claim 2, wherein identification of the plurality of paging opportunities that are to occur during the paging cycle comprises to: compute an index; and access a lookup table to identify the plurality of paging opportunities based on the computed index and an indication of a number of subframes to be used for paging. Example 5 may include the apparatus of claim 4, wherein the communications circuitry is to receive, from the access node, the indication of the number of subframes to be used for paging. Example 6 may include the apparatus of any of claims 1-5, wherein the paging cycle is an extended paging cycle having a length greater than 2.56 seconds. Example 7 may include the apparatus of any of claims 1-5, wherein the UE in which the apparatus is to be included is delay tolerant and a machine-type communication device. Example 8 may include the apparatus of any of claims 1-5, wherein the processing circuitry is to monitor at least one of the plurality of paging opportunities while in a radio resource control ("RRC") Idle mode. Example 9 may include the apparatus of any of claims 1-5, wherein the communications circuitry is to use a Discontinuous Reception ("DRX") cycle for the paging cycle during the operation of the UE on the cell provided by the access node. Example 10 may include the apparatus of any of claims 2-5, wherein a first paging opportunity is zero (0), four (4), five (5), or nine (9) and is to indicate a subframe number of the subframe that includes the paging message.

In various embodiments, example 11 may be an apparatus to be included in an access node, the apparatus comprising: processing circuitry to generate a paging message for a user equipment ("UE") that is to operate on a cell provided by the access node; and communications circuitry, communicatively coupled with the processing circuitry, to transmit the generated paging message to the UE at a plurality of paging opportunities that are to occur during a paging cycle. Example 12 may include the apparatus of claim 11, wherein the communications circuitry is further to transmit, during the paging cycle, a paging frame having a plurality of subframes that respectively correspond with the plurality of paging opportunities, wherein each of the plurality of subframes includes the paging message. Example 13 may include the apparatus of claim 12, wherein the communications circuitry is to transmit the paging frame using a physical downlink shared channel. Example 14 may include the apparatus of claim 11, wherein the communications circuitry is to transmit, to the UE, an indication of a number of subframes to be used for paging. Example 15 may include the apparatus of claim 14, wherein the processing circuitry is to compute the indication of the number of subframes to be used for paging based on a load on the cell provided by the access node. Example 16 may include the apparatus of any of claims 11-15, wherein the paging cycle is an extended paging cycle having a length greater than 2.56 seconds. Example 17 may include the apparatus of any of claims 11-15, wherein the access node in which the apparatus is to be included is an evolved Node B. Example 18 may include the apparatus of any of claims 11-15, wherein the communications circuitry is to use a Discontinuous Reception ("DRX") cycle for the paging cycle. Example 19 may include the apparatus of any of claims 12-13, wherein a first paging opportunity of the plurality of paging opportunities is zero (0), four (4), five (5), or nine (9) and is to indicate a subframe number of the subframe that includes the paging message.

In various embodiments, example 20 may be a method to be performed in a user equipment ("UE"), the method comprising: receiving a paging messaging during a paging cycle associated with operation of the UE on a cell provided by an access node; computing a plurality of paging opportunities that are to occur during the paging cycle; and detecting the paging message at a paging opportunity of the plurality of paging opportunities based on the computing of the plurality of paging opportunities. Example 21 may include the method of claim 20, wherein the paging message is detected in a subframe of a paging frame, and the method further comprising: receiving, during the paging cycle, a paging frame having a plurality of subframes that respectively correspond with the plurality of paging opportunities, wherein each of the plurality of subframes includes the paging message. Example 22 may include the method of any of claims 20-21, wherein the detecting of the paging message is performed during a high-powered state, the method further comprising: transitioning from a low-power state to the high-power state; and checking, during the paging cycle, a synchronization signal transmitted by the access node during the high-power state.

In various embodiments, example 23 may be a method to be performed in an access node, the method comprising: generating a paging message for a user equipment ("UE") that operates on a cell provided by the access node; and transmitting, to the UE, a paging frame having a plurality of subframes that each is to include the generated paging message. Example 24 may include the method of claim 23, further comprising: computing an indication of a number of subframes to be used for paging based on a load on the cell provided by the access node; and transmitting, to the UE, the computed indication of the number of subframes to be used for paging. Example 25 may include the method of any of claims 23-24, wherein a first subframe of the plurality of subframes corresponds with a paging opportunity that is zero (0), four (4), five (5), or nine (9).

In various embodiments, example 26 may be an apparatus to be included in a user equipment ("UE"), the apparatus comprising: means for receiving at least one paging message included in a paging frame during a paging cycle associated with operation of the UE on a cell provided by an access node; means for identifying a plurality of paging opportunities that are to occur during the paging cycle; and means for detecting the paging message in the paging frame based on the identification of the plurality of paging opportunities. Example 27 may include the apparatus of claim 26, wherein the receiving means is further to receive, during the paging cycle, the paging frame having a plurality of subframes that respectively correspond with the plurality of paging opportunities, wherein each of the plurality of subframes includes the paging message. Example 28 may include the apparatus of claim 27, wherein the receiving means is to receive the paging frame using a physical downlink shared channel. Example 29 may include the apparatus of claim 27, wherein detecting means comprises to: means for computing an index; and means for accessing a lookup table to identify the plurality of paging opportunities based on the computed index and an indication of a number of subframes to be used for paging. Example 30 may include the apparatus of claim 29, wherein the receiving means is to receive, from the access node, the indication of the number of subframes to be used for paging. Example 31 may include the apparatus of any of claims 26-30, wherein the paging cycle is an extended paging cycle having a length greater than 2.56 seconds. Example 32 may include the apparatus of any of claims 26-30, wherein the UE in which the apparatus is to be included is delay tolerant and a machine-type communication device.

In various embodiments, example 33 may be one or more non-transitory computer system-readable media comprising computing device-executable instructions, wherein the instructions, in response to execution by a computing device, cause the computing device to: generate a paging message for a user equipment ("UE") that is to operate on a cell provided by the access node; and transmit the generated paging message to the UE at a plurality of paging opportunities that are to occur during a paging cycle. Example 34 may include the one or more non-transitory computer system-readable media of claim 33, wherein the instructions are further to cause the computing device to: transmit, during the paging cycle, a paging frame having a plurality of subframes that respectively correspond with the plurality of paging opportunities, wherein each of the plurality of subframes includes the paging message. Example 35 may include the one or more non-transitory computer system-readable media of claim 33, wherein the instructions are to cause the computing device to transmit the paging frame using a physical downlink shared channel. Example 36 may include the one or more non-transitory computer system-readable media of claim 33, wherein the instructions are to cause the computing device to transmit, to the UE, an indication of a number of subframes to be used for paging. Example 37 may include the one or more non-transitory computer system-readable media of claim 36, wherein the instructions are to cause the computing device to: compute the indication of the number of subframes to be used for paging based on a load on the cell provided by the access node. Example 38 may include the one or more non-transitory computer system-readable media of any of claims 33-36, wherein the paging cycle is an extended paging cycle having a length greater than 2.56 seconds. Example 39 may include the one or more non-transitory computer system-readable media of any of claims 33-36, wherein the one or more non-transitory computer system-readable media is to be included is an evolved Node B. Example 40 may include the one or more non-transitory computer system-readable media of any of claims 33-36, wherein the instructions are to cause the computing device to use a Discontinuous Reception ("DRX") cycle for the paging cycle.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An apparatus to be included in a user equipment ("UE"), the apparatus comprising:
communications circuitry to receive at least one paging message included in a paging frame during a paging cycle associated with operation of the UE on a cell provided by an access node; and
processing circuitry, communicatively coupled with the communications circuitry, to identify a plurality of paging opportunities that are to occur during the paging cycle, and to detect the paging message in the paging frame based on the identification of the plurality of paging opportunities,
wherein:
the paging frame has a plurality of subframes that respectively correspond with the plurality of paging opportunities and each of the plurality of subframes includes the paging message; and
the paging cycle is an extended paging cycle having a length greater than 2.56 seconds.

2. The apparatus of claim 1, wherein the communications circuitry is to receive the paging frame using a physical downlink shared channel.

3. The apparatus of claim 1, wherein identification of the plurality of paging opportunities that are to occur during the paging cycle comprises to:
compute an index; and
access a lookup table to identify the plurality of paging opportunities based on the computed index and an indication of a number of the plurality of subframes to be used for paging.

4. The apparatus of claim 3, wherein the communications circuitry is to receive, from the access node, the indication of the number of the plurality of subframes to be used for paging.

5. The apparatus of claim 1, wherein the UE in which the apparatus is to be included is delay tolerant and a machine-type communication device.

6. The apparatus of claim 1, wherein the processing circuitry is to monitor at least one of the plurality of paging opportunities while in a radio resource control ("RRC") Idle mode.

7. The apparatus of claim 1, wherein the communications circuitry is to use a Discontinuous Reception ("DRX") cycle for the paging cycle during the operation of the UE on the cell provided by the access node.

8. The apparatus of claim 1, wherein a first paging opportunity is zero (0), four (4), five (5), or nine (9) and is to indicate a subframe number of the subframe that includes the paging message.

9. An apparatus to be included in an access node, the apparatus comprising:
processing circuitry to generate a paging message for a user equipment ("UE") that is to operate on a cell provided by the access node; and
communications circuitry, communicatively coupled with the processing circuitry, to transmit the generated paging message to the UE at a plurality of paging opportunities that are to occur during a paging cycle,
wherein:
the paging cycle is an extended paging cycle having a length greater than 2.56 seconds; and
the communications circuitry is further to transmit, during the paging cycle, a paging frame having a plurality of subframes that respectively correspond with the plurality of paging opportunities, wherein each of the plurality of subframes includes the paging message.

10. The apparatus of claim 9, wherein the communications circuitry is to transmit the paging frame using a physical downlink shared channel.

11. The apparatus of claim 9, wherein the communications circuitry is to transmit, to the UE, an indication of a number of subframes to be used for paging.

12. The apparatus of claim 11, wherein the processing circuitry is to compute the indication of the number of subframes to be used for paging based on a load on the cell provided by the access node.

13. The apparatus of claim 9, wherein the access node in which the apparatus is to be included is an evolved Node B.

14. The apparatus of claim 9, wherein the communications circuitry is to use a Discontinuous Reception ("DRX") cycle for the paging cycle.

15. The apparatus of claim 9, wherein a first paging opportunity of the plurality of paging opportunities is zero (0), four (4), five (5), or nine (9) and is to indicate a subframe number of the subframe that includes the paging message.

16. A method to be performed in a user equipment ("UE"), the method comprising:
receiving a paging message during a paging cycle associated with operation of the UE on a cell provided by an access node;
computing a plurality of paging opportunities that are to occur during the paging cycle; and
detecting in a subframe of a paging frame the paging message at a paging opportunity of the plurality of paging opportunities based on the computing of the plurality of paging opportunities,
wherein:
the paging frame has a plurality of subframes that respectively correspond with the plurality of paging opportunities and each of the plurality of subframes includes the paging message; and
the paging cycle is an extended paging cycle having a length greater than 2.56 seconds.

17. The method of claim 16, wherein the detecting of the paging message is performed during a high-powered state, the method further comprising:
transitioning from a low-power state to the high-power state; and
checking, during the paging cycle, a synchronization signal transmitted by the access node during the high-power state.

18. A method to be performed in an access node, the method comprising:
generating a paging message for a user equipment ("UE") that operates on a cell provided by the access node; and
transmitting, to the UE during a paging cycle, a paging frame having a plurality of subframes that each include the generated paging message,
wherein the paging cycle is an extended paging cycle having a length greater than 2.56 seconds and a first subframe of the plurality of subframes corresponds with a paging opportunity that is zero (0), four (4), five (5), or nine (9).

19. The method of claim 18, further comprising:
computing an indication of a number of subframes to be used for paging based on a load on the cell provided by the access node; and
transmitting, to the UE, the computed indication of the number of subframes to be used for paging.

* * * * *